United States Patent
Groendal et al.

[11] Patent Number: 5,935,364
[45] Date of Patent: Aug. 10, 1999

[54] THERMAL FORMING UPHOLSTERY PROCESS

[75] Inventors: Dale M. Groendal, Grand Rapids; James J. Keyzer, Shelbyville, both of Mich.

[73] Assignee: Steelcase Inc., Grand Rapids, Mich.

[21] Appl. No.: 08/720,704

[22] Filed: Oct. 2, 1996

[51] Int. Cl.$^6$ .............................. B32B 31/26; B68G 7/00
[52] U.S. Cl. .............................. 156/216; 156/70; 156/91; 156/227; 29/91.1
[58] Field of Search .............................. 156/70, 91, 216, 156/226, 227; 29/91, 91.1, 91.5; 297/218.1, 218.2, 218.4, 228.11, 224

[56] References Cited

U.S. PATENT DOCUMENTS

| | | |
|---|---|---|
| 1,810,617 | 6/1931 | Maier . |
| 2,151,628 | 3/1939 | Derveer . |
| 2,161,448 | 6/1939 | Bishop . |
| 2,172,224 | 9/1939 | Sailer . |
| 2,361,370 | 10/1944 | Grunwald . |
| 3,029,550 | 4/1962 | Carolan ..................................... 29/91.5 |
| 3,146,143 | 8/1964 | Bolesky et al. ...................... 156/216 X |
| 3,338,630 | 8/1967 | Dudley ................................ 297/228.11 |
| 3,586,370 | 6/1971 | Barecki et al. . |
| 3,747,178 | 7/1973 | Harder, Jr. . |
| 3,911,603 | 10/1975 | Lehrman . |
| 4,114,213 | 9/1978 | Beernaerts et al. . |
| 4,431,229 | 2/1984 | Unger . |
| 4,516,305 | 5/1985 | Unger . |
| 4,650,251 | 3/1987 | Shimada . |
| 4,660,888 | 4/1987 | Urai . |
| 4,718,153 | 1/1988 | Armitage et al. . |
| 4,732,097 | 3/1988 | Guilhem . |
| 4,786,351 | 11/1988 | Elliott et al. . |
| 4,795,517 | 1/1989 | Elliott et al. . |
| 4,818,331 | 4/1989 | Shimada . |
| 4,831,697 | 5/1989 | Urai . |
| 4,844,761 | 7/1989 | Bracesco . |
| 4,860,415 | 8/1989 | Witzke . |
| 4,873,036 | 10/1989 | Urai . |
| 4,874,448 | 10/1989 | Urai . |
| 4,925,513 | 5/1990 | Witzke et al. . |
| 4,968,376 | 11/1990 | Shimada . |
| 4,979,890 | 12/1990 | Bracesco . |
| 5,087,311 | 2/1992 | Elliott et al. . |
| 5,176,777 | 1/1993 | Guilhem . |
| 5,189,772 | 3/1993 | Appelt . |
| 5,231,745 | 8/1993 | Phelan et al. . |
| 5,238,514 | 8/1993 | Tornero . |
| 5,290,093 | 3/1994 | Crayne et al. . |
| 5,308,141 | 5/1994 | Robinson et al. .................... 297/218.4 |
| 5,338,092 | 8/1994 | Wiltsey et al. .................. 297/218.4 X |
| 5,407,510 | 4/1995 | Marfilius et al. . |
| 5,529,373 | 6/1996 | Olson et al. ......................... 297/218.4 |
| 5,562,873 | 10/1996 | Tornero ................................ 156/216 X |
| 5,603,150 | 2/1997 | Assink et al. ......................... 29/91.1 X |
| 5,626,388 | 5/1997 | Haltner ................................ 297/228.11 |
| 5,743,982 | 4/1998 | Marfilius et al. . |

*Primary Examiner*—Curtis Mayes
*Attorney, Agent, or Firm*—Price, Heneveld, Cooper DeWitt & Litton

[57] ABSTRACT

A method for forming upholstered articles involves providing an upholstery fabric having a tensionable drawstring, positioning the upholstery fabric over a front side of an article which is to be upholstered, folding the periphery of the fabric upholstery over edges of the article, applying tension to opposing ends of the drawstring, and securing the ends of the drawstring to the back side of the article to form a preassembled upholstered article. The fabric on the preassembled upholstered article can be adjusted, such as to remove wrinkles. Thereafter, heat can be applied to the preassembled upholstered article to activate thermally activable adhesive disposed between the article and the upholstery fabric to cause the upholstery fabric to be permanently adhered to the article. The process allows the fabric covering to be adjusted before the fabric is permanently adhered to the article, thus eliminating or reducing scrap, such as completed assemblies which are unsuitable for use on account of wrinkles or partial misalignment of the upholstery fabric on the article which is to be upholstered.

20 Claims, 3 Drawing Sheets

THERMAL FORMING UPHOLSTERY PROCESS

BACKGROUND OF THE INVENTION

This invention relates to a process for forming an upholstered article, and more particularly, to a process for thermal forming upholstered articles using a drawstring which facilitates preassembly of the components of the upholstered article and allows the fabric upholstery covering to be adjusted to remove wrinkles before the fabric and cushions are conformed to the shape of a mold die and adhered together by application of heat, and simultaneously secured to a rigid substrate.

U.S. Pat. No. 4,718,153 (assigned to Steelcase, Inc., the assignee of this invention) discloses a cushion manufacturing process wherein a sculptured, upholstered cushion is prepared by placing a non-preformed sheet of upholstery fabric, a non-pre-formed foam cushion and adhesive means within a die, with the adhesive means disposed between the fabric and the foam cushion, urging the dies together to compress the cushion and force the fabric and cushion to conform to the shape of a die, and injecting hot vapors into the die cavity to cause the cushion to retain the shape of the die. The molded, upholstered cushion is then removed from the die and the excess fabric topping layer and backing sheet are trimmed from the cushion, leaving a narrow web or flange of material which is secured to a chair shell. It would be desirable to provide a thermal forming process for preparing an upholstered article, wherein the need for a separate trimming step is eliminated. Further, it would be desirable to provide such a thermal forming process wherein the fabric can be adjusted and retained in an adjusted state to eliminate wrinkles in the outer fabric upholstery covering.

U.S. Pat. No. 4,732,097 discloses a process for upholstering an object. The process involves the steps of cutting out a flexible piece of fabric having a shape corresponding to one side of an object to be upholstered, stitching onto the border of the fabric an auxiliary thread for providing an overcast passage extending along the border of the fabric, placing a tensioning thread in the passage, covering the front face of the object with the piece of fabric, folding back the border at the edge of the object and applying tension to the ends of the tensioning thread to tighten and fold the border, and locking the ends of the tensioned threads to secure the fabric covering over one side of the object. This patent does not mention applying heat to the fabric, an underlying foam layer and an intervening adhesive layer to shape the fabric and foam and adhere them together.

SUMMARY OF THE INVENTION

This invention pertains to a process for forming upholstered articles by a thermal forming process wherein an upholstery fabric and foam padding layer are held together in a preassembled state by a drawstring located along the border of the fabric covering, and subsequently exposing the preassembled article to heat and pressure in a mold to cause the fabric and foam padding to conform to the shape of a mold die. The process allows the fabric covering to be adjusted to remove wrinkles from the fabric before heat is applied to cause a heat activated adhesive to permanently adhere the fabric to the foam padding. The ability to adjust the upholstery fabric to eliminate wrinkles is of great advantage because it can lead to a significant reduction in scrap, e.g. completed assemblies which are unsuitable for use on account of wrinkles in the fabric covering or partial misalignment of the upholstery fabric covering with the foam or rigid substrate.

The process generally comprises the steps of providing an upholstery fabric having a tensionable drawstring disposed within a tunnel along the border thereof and being sized and shaped to cover a front side or face of a composite cushion assembly including a foam padding and a rigid substrate to which the foam padding is secured; preassembling the upholstered article by positioning the upholstery fabric over a foam cushioned side of the composite cushion, with a thermally activatable adhesive disposed between the foam cushion of the composite cushion assembly and the upholstery fabric; folding the border of the fabric upholstery over the edges of the composite cushion, applying tension to the ends of the drawstring, and securing the ends of the drawstring to the back side of the composite cushion assembly; optionally adjusting the fabric on the composite cushion assembly, for example, to straighten the fabric as needed or desired such as to remove wrinkles; and permanently adhering the upholstery fabric covering to the foam cushion and shaping the fabric and foam cushion by application of heat and pressure.

DETAILED DESCRIPTION OF THE PREFERRED EMBODIMENT

Figure 1:
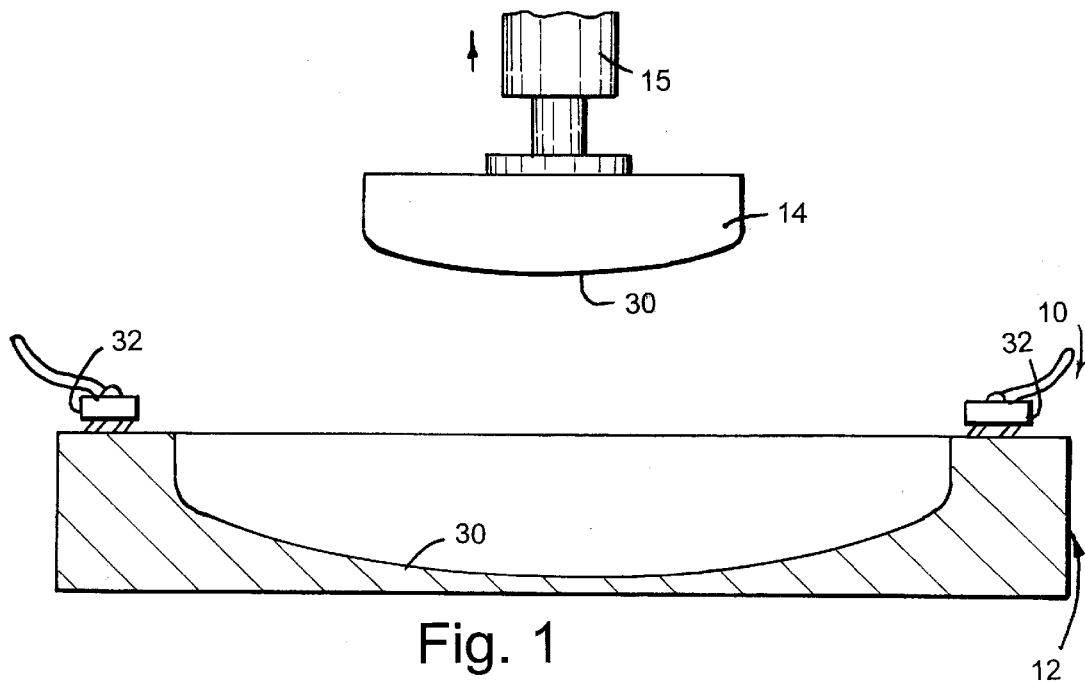
FIG. 1 is a cross-sectional view of an press for attaching upholstery with a tensionable drawstring to a composite cushion assembly to form a preassembled upholstered article.
Figure 3:
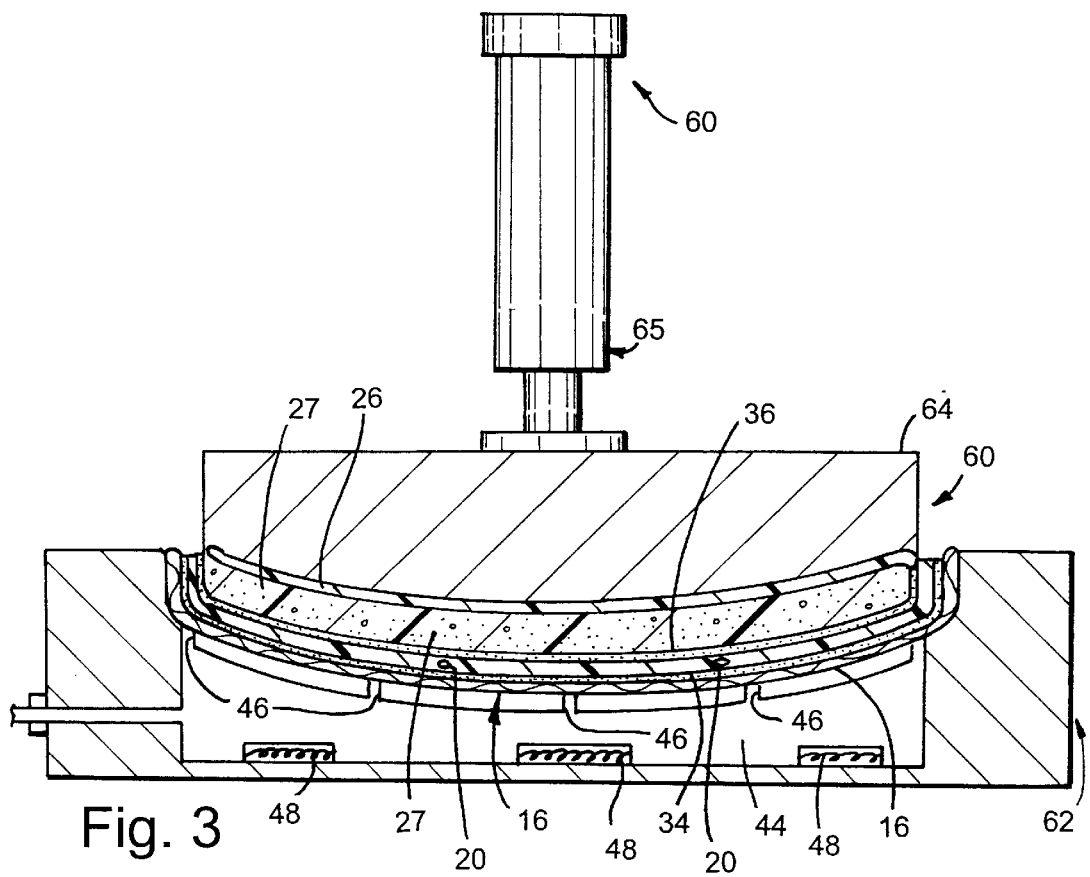
FIG. 3 is a cross-sectional view of a mold press for permanently adhering the upholstery fabric of the preassembled upholstered article to the composite cushion assembly, with the upper die press lowered and compressing the upholstery fabric covering, the thin foam layer, the adhesive films and the cushion assembly.
Figure 4:
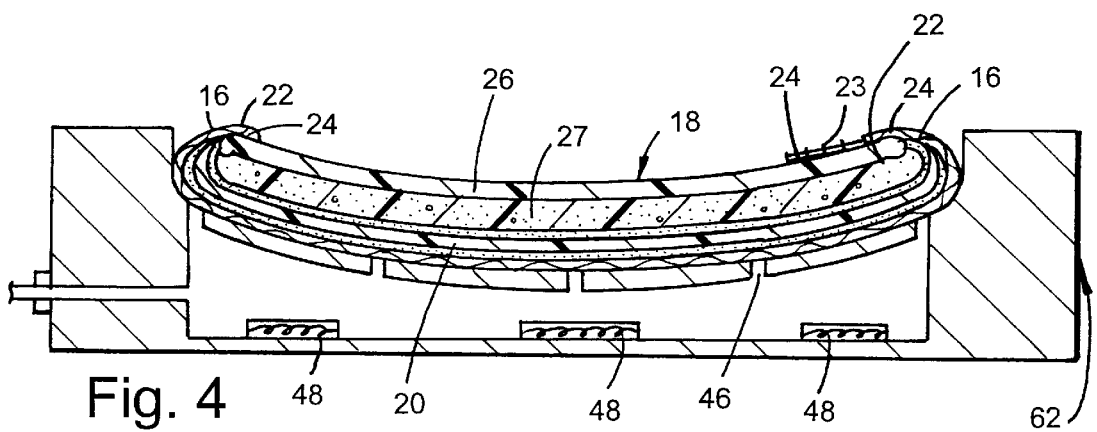
FIG. 4 is a cross-sectional view substantially along the same plane as FIG. 3, but with the mold press opened and the upholstery fabric covering, thin foam layer, and composite cushion assembly held together in a complete assembled condition.

The process of the present invention involves the use of a press 10 having a lower die 12 which is configured to a desired shape of a front or upholstered side of an upholstered article. The lower die can include sculptured effects such as ridges or the like if desired. Press 10 also includes an upper die 14 (FIGS. 1 and 2) mounted on a pneumatic or hydraulic cylinder 15 which has the general shape of the back or non-upholstered side of the upholstered article. The process generally comprises placing a piece of upholstery fabric 16, which is shaped to cover a side of a composite foam cushion 18 and includes a drawstring tunnel 22 around the border or edge thereof, over the lower die 12; positioning a thin layer of cushion material (such as foamed plastic or a non-woven polyester cushion) or topping layer 20 over the upholstery fabric 16, with a heat sensitive adhesive preapplied to the side of the upholstery fabric 16 facing the topping layer 20, on the surface of the topping layer 20 facing the upholstery fabric 16, or a film heat sensitive adhesive disposed between the upholstery fabric 16 and the topping layer 20, and with a heat sensitive adhesive preapplied to the side of the topping layer 20 opposite the side facing the upholstery fabric 16 or a film or web of heat sensitive adhesive placed over the side of the topping layer 20 opposite the side facing the upholstery fabric 16; or in the event that a topping layer is not used, a heat sensitive adhesive is preapplied to the side of the upholstery fabric facing away from an upper surface of the lower die 12 or on the side of the composite foam cushion 18 which the upholstery fabric 16 is to cover, or a film of heat sensitive adhesive is placed over the side of the upholstery fabric 16 opposite the side facing the interior or upper surface of lower die 12; pressing a composite foam cushion 18 against the upwardly facing side of the material or materials placed on the lower die 12; folding the edges or border of upholstery fabric 16 over the edges and back side of the composite foam cushion 18; tensioning a drawstring threaded through the tunnel on the edge or border of the upholstery fabric 16; securing the ends of the tensioned drawstring to the back side of the composite foam cushion to form a preassembled upholstered article; optionally removing the preassembled upholstered article from the mold press 10, and adjusting the fabric on the composite foam cushion 18, such as to remove wrinkles; positioning the preassembled upholstered article in a mold press 60 (FIGS. 3 and 4) having a lower die 62 which is configured to the desired shape of the front of the upholstered article and an upper die 64 which has the general shape of the back of the upholstered article; and permanently adhering the upholstery fabric covering to the foam cushion and shaping the fabric and foam cushion by application of heat and pressure in the mold press 60. The process facilitates the preparation of an upholstered article having a rigid substrate or backing, a foam cushion layer, an optional topping layer 20 disposed between the foam layer and an outer upholstery fabric layer 16. The process includes preassembly of the upholstered article, wherein the components thereof are held together by a tensioned drawstring which allows the fabric to be adjusted as desired, such as to remove wrinkles; followed by thermal forming, wherein the upholstery fabric 16, foam cushion layer of the composite foam cushion 18, and optional topping layer 20 are permanently contoured and permanently adhered together by a heat sensitive adhesive.

Figure 5:
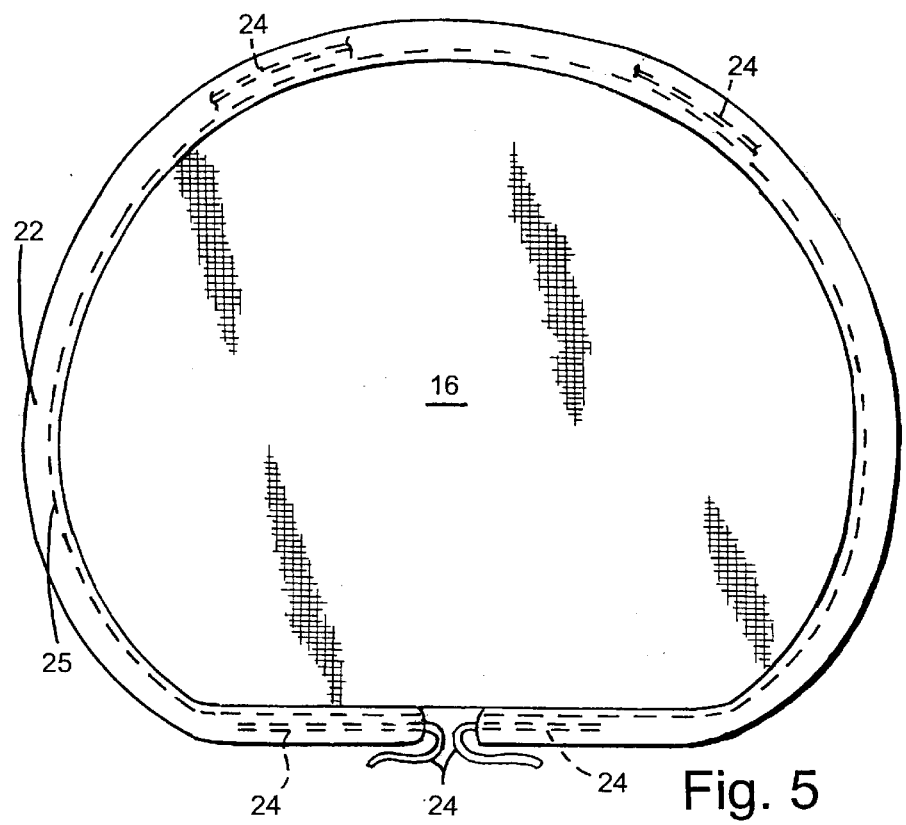
FIG. 5 is a top plan view of the interior side of an upholstery fabric covering having a drawstring tunnel along the border thereof.

In accordance with one aspect of the invention, the upholstery fabric covering 16 (FIG. 5) is shaped to cover a front, top, or upholstered side of an upholstered article, such as a chair seat or chair back, with the fabric 16 generally being somewhat larger than the surface or face of the article which is to be covered such that the border of the upholstery fabric covering 16 can be folded around the edges and toward the back side of the composite foam cushion 18. The border or edges of the upholstery fabric covering 16 includes a tunnel 22 which can be formed by folding a strip of fabric lengthwise and joining the edges of the folded strip of fabric to the edges of the upholstery fabric 16, such that tunnel 22 is secured to fabric 16 by stitches 25. Suitable means of joining the fabric strip to the upholstery fabric includes sewing, ultrasonic bonding, and the like. Tunnel 22 extends around a sufficient portion of the periphery of upholstery fabric 16 so that a tensioned drawstring threaded through tunnel 22 can be used to secure the upholstery fabric to the composite foam cushion 18 in a preassembled state.

Generally, tunnel 22 will extend almost entirely around the periphery of upholster fabric 16 with only a relatively small gap between the ends thereof whereby a drawstring 24 can be tensioned. Drawstring 24 can be threaded through tunnel 22 after tunnel 22 is formed. However, in accordance with a preferred aspect of the invention, a fabric strip is folded over a drawstring by a folder block located adjacent the needle plate, and the drawstring and folded fabric strip are drawn together over a needle plate of a sewing machine where the folded edges of the fabric strip are stitched to the periphery of the upholstery fabric 16 with the drawstring disposed between the overlapping pleats of the folded fabric strip. This method provides a simple and inexpensive means for simultaneously attaching a drawstring and a drawstring tunnel to the periphery of an upholstery fabric. Of course, other alternative methods can be used for providing a tunnel 22 without departing from the principles of this invention. For example, a tunnel can be provided by forming tunnel stitches along the perimeter of the fabric as taught by Guilhem (U.S. Pat. No. 4,732,097), or by sewing a preformed tunnel to the periphery of the upholstery fabric covering 16. The material of which upholstery fabric cover 16 is comprised can generally be any known upholstery fabric, including woven and knitted cloth, flexible vinyl materials such as plasticized polyvinyl chloride, simulated leather, natural leather, and the like. The fabric strip used to form the tunnel 22 can be generally any suitable cloth or other fabric, although relatively strong and inexpensive scrims, such as polyethylene, polypropylene, polyester and nylon scrims, are preferred.

The composite foam cushion 18 is generally comprised of a relatively rigid substrate or backing 26, which is preferably formed of a thermoplastic material such as polypropylene, such as by injecting molding. The substrate 26 is preferably formed with a plurality of rearwardly projecting stiffening ribs 28 which improve the strength and rigidity of the finished upholstered article. Alternatively, the substrate 26 can be made of other relatively rigid materials such as particle board, wood, and the like.

The composite foam cushion 18 also includes a relatively thick cushion layer 27. Cushion layer 27 is preferably a skinned foamed polyurethane bun or pad, which has a density of about 2.5 pounds per cubic foot. Skin can be conveniently avoided by using cut foam, rather than molded buns. Foam cushion layer 27 can be made of various other materials if desired.

The upholstery fabric covering 16 is positioned over the upwardly facing surface 30 of lower die 12. Preferably, upholstery fabric covering 16 is pushed downwardly against the surface 30, and is held by a suitable retainer element, such as a retainer ring and/or slip clamps 32, which are generally disposed outwardly from and adjacent to the perimeter of the die cavity defined by the upwardly facing surface 30 of lower die 12. The retainer rings or slip clamps 32 prevent the fabric from being drawn too quickly into the lower die when the composite foam cushion 18 is pressed downwardly against the upholstery fabric by the upper die 14, to allow the fabric 16 and optional topping layer 20 to be drawn smoothly against surfaces of the cavity of lower die 12. Suitable slip clamps or retainer elements for controlling the rate at which upholstery fabric 16 is drawn into the cavity defined by lower die 12 are well known to the art and are, for example, disclosed in U.S. Pat. No. 4,718,153.

A suitable optional topping layer 20 can be a low density, unskinned polyurethane foam having a CMV 45 or 30 HR (high resilient) density. The topping layer has a size and shape which generally conforms to that of the upholstery fabric. The pore size of the polyurethane is preferably related to the particle size of the adhesive used for adhering the topping layer to the upholstery fabric 16 and to the foam cushion layer 27 of composite foam cushion 18, in as much as the adhesive should not penetrate extremely deeply into the pores of the foam after it is applied, because it is desired to have most of the adhesive at the surfaces of the topping layer.

The upholstered articles, such as chair seats and chair backs, prepared in accordance with the method of this invention are preferably provided with a topping layer 20 to provide improved cushioning and comfort in such articles.

The heat sensitive adhesive used to permanently attach the upholstery fabric 16 to the foam cushion layer 27, or to the optional topping layer 20, and for permanently adhering the optional topping layer 20 to the foam cushion layer 27 is preferably a granular thermoplastic adhesive having a grain size of between 800 and 700 microns. Nylon or polyester are examples of types of hot melts which can be used. The grain size can be between 500 and 700 microns. The melting point of the thermoplastic adhesive should be from about 185° F. to about 215° F. A hot melt adhesive having a melting point at about 205° F. was found to be very acceptable. The adhesive is preferably uniformly applied to or disposed between surfaces which are to be adhered at from about 1.5 to about 8 grams per square foot, and preferably between about 2.5 and 3.5 grams per square foot. When a topping layer 20 is used, adhesive is preferably preapplied to each side of the topping layer 20 at the prescribed rates. Alternatively, the heat sensitive adhesive can be applied between the upholstery fabric 16 and the topping layer 20, and over the topping layer 20, in the form of a pre-formed thin film or adhesive scrim. Likewise, when a topping layer 20 is not used, the heat sensitive adhesive can be preapplied to either the upholstery fabric 16, the foam cushion layer 27, or both. Alternatively, the heat sensitive adhesive can be positioned, in the form of a pre-formed film, scrim or non-woven web over the upholstery fabric 16 after the upholstery fabric is positioned over upwardly facing surface 30 of lower die 12. As another alternative, the heat sensitive adhesive can be applied to the upholstery fabric, the foam cushion layer 27, the optional topping layer 20, or any combination thereof by spraying hot melt adhesive on surfaces thereof. The adhesive material is preferably sprayed in a web-like, open pattern. Suitable hot melt adhesives include polyester, ethylene vinyl acetates (EVAs), polyethanes and polyamides having an initial melting point of about 190° F. After each time it is melted, it has a somewhat higher melting point. This facilitates application at a lower temperature and resistance to deterioration after application. One important advantage to this type of adhesive over powdered adhesive is that it does not loose adhesive strength at the bond line as a result of particles dropping into the opening in the foam cushion layer 27 or in the topping layer 20. As a result, it is possible to use as little as about 1.5 grams per square foot per side of material which is to be adhered to another material. Yet another alternative adhesive is a solvent spray, thermoplastic adhesive. Such materials are usually urethane.

Figure 2:
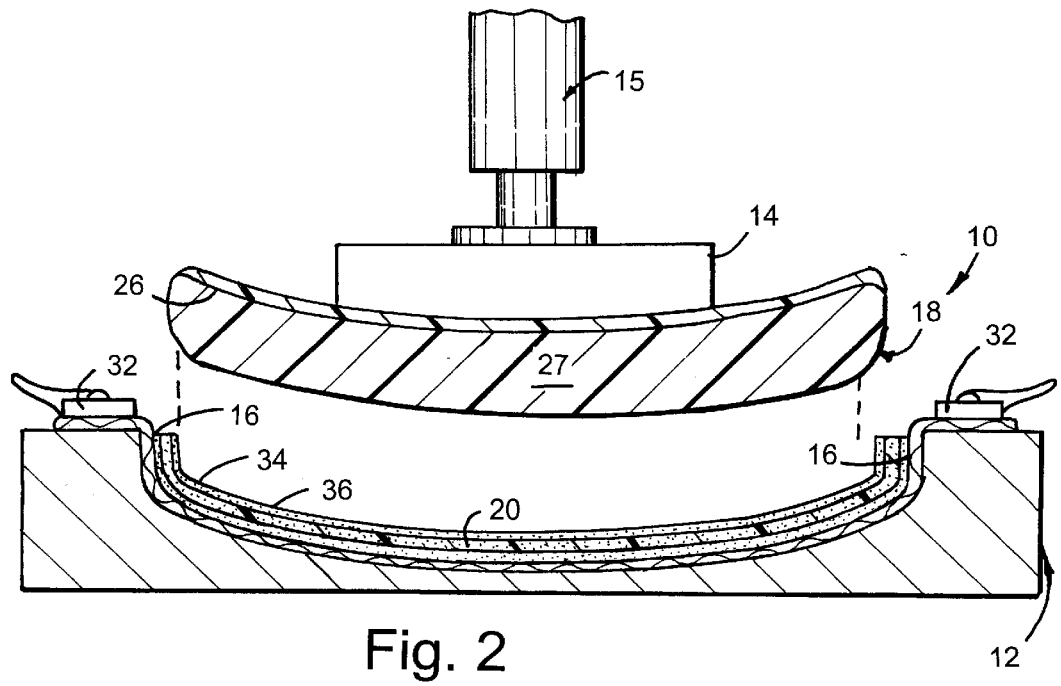
FIG. 2 is a cross-sectional view substantially along the same plane as FIG. 1, but with an upholstery fabric covering, thin foam layer and thin film of heat activatable adhesive positioned in a lower die cavity, and a cushion assembly held on the upper die.
Figure 6:
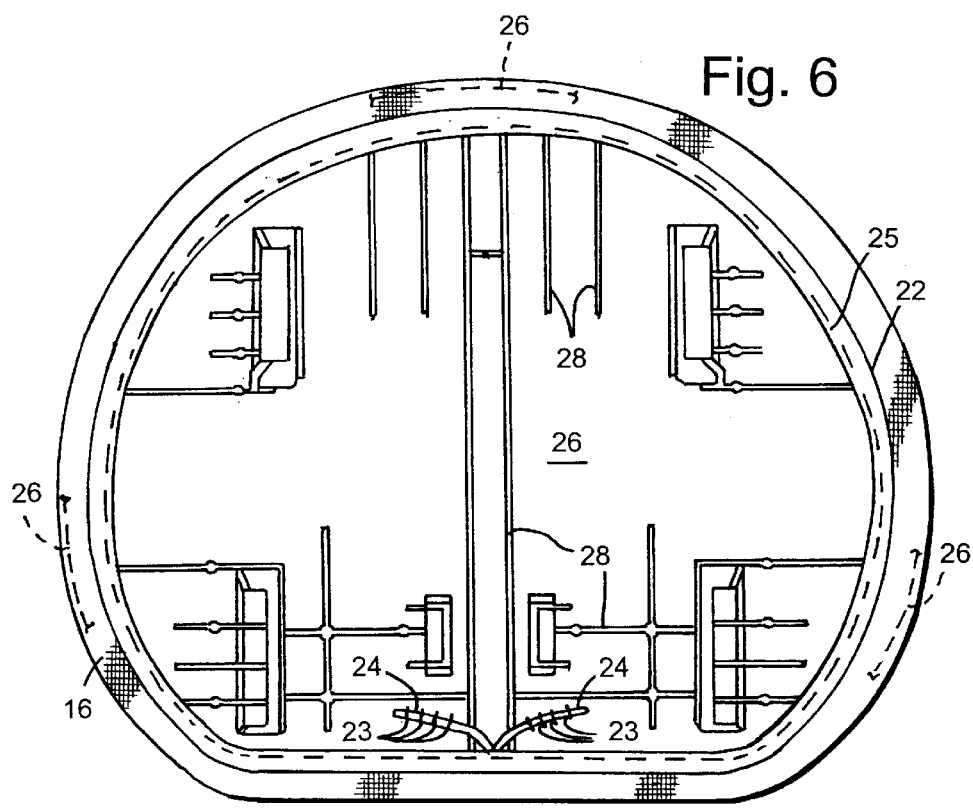
FIG. 6 is an elevational view of the rear side of a preassembled upholstered article in accordance with the present invention.

In accordance with a preferred mode of practicing the invention, wherein a topping layer 20 is disposed between the foam cushion layer 27 and the upholstery fabric 16, an upholstery fabric 16 of suitable size and shape to cover a top, front or face of a composite foam cushion, and wrap around the edges thereof, is positioned over the upwardly facing surface 30 defining a mold cavity of lower die 12, and loosely clamped to the edges of the mold cavity by a plurality of slip clamps 32 which allow the upholstery fabric 16 to be pushed down into the mold cavity of lower die 12 when a force is applied to the fabric 16 positioned over surface 30. A heat sensitive adhesive layer 34 is disposed over the upholstery fabric 16 on the side opposite the side facing the surface 30. Topping layer 20 is positioned over upholstery fabric 16 with adhesive layer 34 disposed therebetween. Another adhesive layer 36 is disposed over topping layer 20. Adhesive layers 34 and 36 can be applied in any suitable manner such as by gravure roller, slot die extrusion, spraying, positioning pre-formed films, etc. Most preferably, adhesive layers 34 and 36 are preapplied to each side of topping layer 20. Composite foam cushion 18 comprised of foam cushion layer 27 secured to rigid substrate 26 is supported from upper die 12 as shown in FIG. 2. A preferred method of securing rigid substrate 26 to foam cushion layer 27 is by using an adhesive applied to the abutting surfaces thereof, such as a hot melt adhesive. A convenient means of supporting composite foam cushion 18 on upper die 14 is to provide upper die 14 with an enclosed chamber 38 (not shown) into which a vacuum can be drawn as needed. Upper die 14 is then urged downwardly toward lower die 12 so that foam cushion layer 27 and topping layer 20 are compressed and fabric 16 is forced against surface 30 of lower die 12. The composite foam cushion 18 and the topping layer 20 have a combined thickness greater than the distances between the surfaces 30 and 40 of lower and upper dies 12 and 14 respectively. With upper die 14 urged downwardly to compress foam cushion layer 27 and topping layer 20 together, slip clamps 32 are released, the edges or border of upholstery fabric 16 are folded over inwardly toward the back side of the composite foam cushion 18, the ends of drawstring 24 are tensioned sufficiently to cause upholstery fabric 16 to be secured to composite foam cushion 18, and the tensioned ends of drawstring 24 are secured to the back side of composite foam cushion 18 to form a preassembled upholstered article. A suitable technique for attaching the ends of the drawstring to the back side of the composite foam cushion is with staples 23, as shown in FIG. 6.

In order to insure that the upholstered fabric 16 is not wrinkled, the preassembled upholstered article is removed from press 10, examined, and the fabric 16 is adjusted as necessary, such as to remove wrinkles, before the adhesive is heated to adhere the fabric 16 to topping layer 20, and topping layer 20 to foam cushion layer 27. After any desired adjustments have been made to fabric 16, the preassembled upholstered article is placed in mold press 60 and recompressed by urging upper die 64 downwardly toward lower die 62 by means of a pneumatic or hydraulic cylinder 65. The heat sensitive adhesive layers 34 and 36 are then heated, preferably by injecting steam into steam chamber 44 of lower die 12, where upon steam will emerge through openings 46 in surface 30 of lower die 12. The provision of steam chamber 44 is desirable, but not necessary, to minimize the mass of the lower die which must be heated when the steam is injected into the mold cavity. This reduces condensation which occurs within the lower die and within the mold cavity because little of the steams heat will be used in heating the machinery. To further reduce condensation of steam/or the lowering of steam temperature, a plurality of electrical resistance heaters 48 are positioned along the lower wall of steam chamber 44 to heat the steam chamber and the lower die surface 30. Preferably, heaters 48 are operated to heat steam chamber 44 to a temperature of roughly between 220 to 240° F. This will also have the effect of heating lower die surface 30 to reduce condensation which may take place during steam injection. Introduction of steam through opening 46 causes adhesive layers 34 and 36 to melt at the abutting surfaces between the upholstery fabric and topping layer, and between the topping layer and the foam cushion layer. This occurs relatively rapidly, generally within a few seconds. Thereafter, steam is shut-off to the steam chamber 44, and cooling air is drawn into the mold cavity by applying a vacuum to chamber 44. This causes the melted adhesive to quickly solidify and permanently adhere the upper surface of the topping layer 20 to the foam cushion layer 27, and the lower surface of the topping layer 20 to the fabric 16. Application of the vacuum to chamber 44 also draws moisture from the completed upholstered article is then removed from the mold press.

Upholstered articles can also be prepared in accordance with the principles of this invention without using a topping layer 20. In this case, all of the steps are substantially the same, as described above, except that a topping layer 20 is not used, and only one heat sensitive adhesive layer is used between the fabric 16 and the foam cushion layer 27.

The embodiments of the invention in which an exclusive property or privilege is claimed are defined as follows:

1. A method for forming upholstered articles, comprising:
  providing an upholstery fabric having a tensionable drawstring disposed within a tunnel along the periphery thereof;
  positioning the upholstery fabric over a front side of an article which is to be upholstered, with a thermally activatable adhesive disposed between the article and the upholstery fabric;
  folding the periphery of the fabric upholstery over edges of the article, the tunnel being formed on the upholstery fabric by folding a strip of fabric lengthwise and joining the edges of the folded strip of fabric to the edges of the upholstery fabric;
  applying tension to opposing ends of the drawstring;
  securing the ends of the drawstring to the back side of the article to form a preassembled upholstered article;
  adjusting the fabric on the preassembled upholstered article as needed; and
  after the ends of the drawstring have been tensioned and secured to the back side of the article, applying heat to the preassembled upholstered article to activate the thermally activatable adhesive and cause the upholstery fabric to be permanently adhered to the article.

2. The method of claim 1, further comprising disposing a thin layer of foam cushion between the article and the upholstery fabric, with thermally activatable adhesive disposed between the upholstery fabric and the thin layer of foam cushion and between the foam cushion and the article.

3. The method of claim 2, wherein the thermally activatable adhesive is preapplied to each side of the thin layer of foam cushion.

4. The method of claim 1, wherein the article is a composite foam cushion comprised of a rigid substrate and a cushion layer which are secured together.

5. The method of claim 4, wherein the rigid substrate is formed from a thermoplastic material.

6. The method of claim 5, further comprising disposing a thin layer of foam cushion between the article and the upholstery fabric, with thermally activatable adhesive disposed between the upholstery fabric and the thin layer of foam cushion and between the foam cushion and the article.

7. The method of claim 6, wherein the thin layer of foam cushion is an unskinned polyurethane foam having a lower density than the cushion layer of the article.

8. The method of claim 1, wherein the thermally activatable adhesive is a polyester, nylon, ethylene vinyl acetate or polyurethane hot melt adhesive having a melting point of from about 185° F. to about 215° F.

9. The method of claim 8, wherein the thermally activatable adhesive is applied between surfaces which are to be adhered at from about 1.5 to about 8 grams per square foot.

10. A method for forming upholstered articles, comprising:
  providing an upholstery fabric having a tensionable drawstring disposed within a tunnel along the periphery thereof;
  positioning the upholstery fabric over a front side of an article which is to be upholstered, with a thermally activatable adhesive disposed between the article and the upholstery fabric;
  folding the periphery of the fabric upholstery over edges of the article, the tunnel and drawstring being simultaneously attached to the periphery of the upholstery fabric by folding a strip of fabric over a drawstring and joining the folded edges of the fabric strip to the periphery of the upholstery fabric with the drawstring disposed between overlapping pleats of the folded fabric strip;
  applying tension to opposing ends of the drawstring;
  securing the ends of the drawstring to the back side of the article to form a preassembled upholstered article;
  adjusting the fabric on the preassembled upholstered article as needed; and
  after the ends of the drawstring have been tensioned and secured to the back side of the article, applying heat to the preassembled upholstered article to activate the thermally activatable adhesive and cause the upholstery fabric to be permanently adhered to the article.

11. A method for making upholstered articles comprising:
  providing an upholstery fabric which is sized and shaped to cover a side of an article which is to be upholstered;
  folding an elongate strip of fabric lengthwise;
  positioning the folded strip of fabric so that the edges thereof overlap the periphery of the upholstery fabric;
  joining the edges of the folded strip of fabric to the periphery of the upholstery fabric to form a drawstring tunnel;
  positioning a drawstring within the tunnel, with opposing ends of the drawstring extending beyond ends of the tunnel;
  providing a thermally activatable adhesive;
  causing the periphery of the upholstery fabric to fold over edges of the article which is to be upholstered and toward a backside thereof, with the thermally activatable adhesive disposed between the article and the upholstery fabric;
  securing the upholstery fabric to the article by applying tension to the opposing ends of the drawstring;
  attaching the ends of the drawstring to the backside of the article; and
  after the ends of the drawstring have been tensioned and secured to the back side of the article, applying heat to the article to activate the thermally activatable adhesive and cause the upholstery fabric to be permanently adhered to the article.

12. The method of claim 11, wherein the tunnel and drawstring are simultaneously attached to the periphery of the upholstery fabric by folding a strip of fabric over a drawstring and sewing the folded edges of the fabric strip to the periphery of the upholstery fabric with the drawstring disposed between overlapping pleats of the folded fabric strip.

13. A method for making upholstered articles, comprising:

providing a mold press having a lower die including walls defining a die cavity having the desired shape of a front, upholstered side of the upholstered article, and an upper die which has the general shape of a back, non-upholstered side of the upholstered article;

providing an upholstery fabric having a tensionable drawstring disposed within a tunnel along the periphery thereof, the upholstery fabric being sized and shaped to cover a front side of an article which is to be upholstered;

positioning the upholstery fabric over the cavity defined by the walls of the lower die;

positioning a thin layer of foam cushion over the upholstery fabric, the thin layer of foam cushion having a size and shape which generally conforms to that of the upholstery fabric, with thermally activatable adhesive disposed between the upholstery fabric and one side of the thin layer of foam cushion, and on an opposite side of the thin layer of foam cushion;

supporting the article which is to be upholstered on the upper die;

urging the upper and lower die together to compress the upholstery fabric, the thin layer of foam cushion, and the article which is to be upholstered together;

causing the periphery of the upholstery fabric to fold over edges of the article which is to be upholstered and toward a back side thereof;

applying tension to opposing ends of the drawstring;

securing the ends of the drawstring to the back side of the article which is to be upholstered;

separating the upper and lower dies; adjusting the fabric as needed including removing the preassembled upholstered article, adjusting the fabric on the article, and replacing the preassembled upholstered article in the mold press and; thereafter recompressing the preassembled upholstered article; and after the ends of the drawstring have been tensioned and secured to the back side of the article, applying heat to the preassembled upholstered article to activate the thermally activatable adhesive and cause the upholstery fabric to be permanently adhered to one side of the thin layer of foam cushion and the other side of the thin layer of foam cushion to be adhered to the article.

14. The method of claim 13, wherein the thermally activatable adhesive is preapplied to each side of the thin layer of foam cushion.

15. The method of claim 13, wherein the tunnel is formed on the upholstery fabric by folding a strip of fabric lengthwise and sewing the edges of the folded strip of fabric to the edges of the upholstery fabric.

16. The method of claim 13, wherein the tunnel and drawstring are simultaneously attached to the periphery of the upholstery fabric by folding a strip of fabric over a drawstring and sewing the folded edges of the fabric strip to the periphery of the upholstery fabric with the drawstring disposed between overlapping pleats of the folded fabric strip.

17. The method of claim 13, wherein the article is a composite foam cushion comprised of a rigid substrate and a cushion layer which are secured together.

18. The method of claim 17, wherein the rigid substrate is formed from a thermoplastic material.

19. The method of claim 13, wherein the step of applying heat to the preassembled upholstered article comprises exposing the preassembled upholstered article to steam.

20. The method of claim 19, wherein the steam emerges through openings in the walls defining the die cavity.

* * * * *

UNITED STATES PATENT AND TRADEMARK OFFICE
CERTIFICATE OF CORRECTION

PATENT NO. : 5,935,364
DATED : August 10, 1999
INVENTOR(S) : Groendal, et. al.

It is certified that error appears in the above-identified patent and that said Letters Patent is hereby corrected as shown below:

Abstract, lines 12 & 13;
 "activable" should be --activatable--.

Column 2, line 23;
 "an press" should be --a press--.

Column 4, line 2;
 "upholster" should be --upholstery--.

Column 5, lines 4 & 5;
 "in as much as" should be --inasmuch as--.

Column 5, lines 46 & 47;
 "polyethanes" should be --polyurethanes--.

Column 6, line 59;
 "steams heat" should be --steam's heat--.

Column 7, Claim 1, line 32;
 "fabric upholstery" should be --upholstery fabric--.

Signed and Sealed this

Thirtieth Day of May, 2000

Attest:

Q. TODD DICKINSON

*Attesting Officer*          *Director of Patents and Trademarks*